(12) United States Patent
Mathon et al.

(10) Patent No.: US 12,293,285 B2
(45) Date of Patent: May 6, 2025

(54) UTILIZING A NEURAL NETWORK MODEL TO PREDICT CONTENT MEMORABILITY BASED ON EXTERNAL AND BIOMETRIC FACTORS

(71) Applicant: Accenture Global Solutions Limited, Dublin (IE)

(72) Inventors: Edouard Mathon, Antibes (FR); Christian Souche, Cannes (FR); Ji Tang, Valbonne (FR)

(73) Assignee: Accenture Global Solutions Limited, Dublin (IE)

( * ) Notice: Subject to any disclaimer, the term of this patent is extended or adjusted under 35 U.S.C. 154(b) by 1008 days.

(21) Appl. No.: 17/302,569

(22) Filed: May 6, 2021

(65) Prior Publication Data
US 2022/0358357 A1  Nov. 10, 2022

(51) Int. Cl.
*G06Q 30/02* (2023.01)
*G06F 3/01* (2006.01)
*G06F 11/34* (2006.01)
*G06N 3/044* (2023.01)
*G06N 3/08* (2023.01)
(Continued)

(52) U.S. Cl.
CPC ............ *G06N 3/08* (2013.01); *G06F 3/015* (2013.01); *G06F 11/3438* (2013.01); *G06N 3/044* (2023.01); *G06N 7/01* (2023.01); *G06Q 30/0255* (2013.01)

(58) Field of Classification Search
CPC .. G06Q 30/0207–30/0277; G06N 3/08; G06N 3/044; G06N 7/01; G06N 3/09; G06F 3/015; G06F 11/3438
See application file for complete search history.

(56) References Cited

U.S. PATENT DOCUMENTS 7,365,651 B2 * 4/2008 Massey ............... A61B 5/18 701/1
11,449,790 B2 * 9/2022 Hong .................. A61B 5/7267
(Continued)

OTHER PUBLICATIONS

Co-pending U.S. Appl. No. 17/210,155, entitled "Utilizing Neural Network Models to Determine Content Placement Based on Memorability," by Souche et al., filed Mar. 23, 2021, 54 Pages.
(Continued)

*Primary Examiner* — Thuy N Nguyen
(74) *Attorney, Agent, or Firm* — Polsinelli PC

(57) ABSTRACT

A device may receive target user category data identifying a target user, daily user data associated with the target user, real-time user data associated with the target user, and content data. The device may convert the target user category data, the daily user data, the real-time user data, and the content data into embedded target user category data, embedded daily user data, embedded real-time user data, and embedded content data. The device may process the embedded target user category data, the embedded daily user data, and the embedded real-time user data, with a neural network model, to determine a real-time user state and may determine a real-time user memory score. The device may process the embedded content data, the real-time user state, and the real-time user memory score, with the neural network model, to determine a memorability score and may perform one or more actions based on the memorability score.

19 Claims, 10 Drawing Sheets

(51) Int. Cl.
*G06N 7/01* (2023.01)
*G06Q 30/0251* (2023.01)

(56) References Cited

U.S. PATENT DOCUMENTS

| | | | | |
|---|---|---|---|---|
| 2012/0284332 | A1* | 11/2012 | Pradeep | G06Q 30/0269 709/204 |
| 2013/0132172 | A1* | 5/2013 | Liu | G06Q 30/02 705/14.62 |
| 2015/0200967 | A1* | 7/2015 | Redlich | G06F 16/282 726/1 |
| 2017/0003961 | A1* | 1/2017 | Gschwind | G06F 9/3001 |
| 2017/0208027 | A1* | 7/2017 | Goldstein | H04L 51/226 |
| 2017/0326331 | A1* | 11/2017 | Joseph | G16H 50/20 |
| 2018/0254097 | A1* | 9/2018 | Gani | G06F 3/013 |
| 2019/0156210 | A1* | 5/2019 | He | G06N 3/045 |
| 2019/0228439 | A1* | 7/2019 | Anthony | G06Q 30/0271 |
| 2020/0174487 | A1* | 6/2020 | Viswanathan | G01C 21/30 |
| 2020/0302234 | A1* | 9/2020 | Walters | G06F 16/9035 |
| 2020/0322301 | A1* | 10/2020 | Goldstein | H04L 51/226 |
| 2020/0334344 | A1* | 10/2020 | Schwartz | H04L 63/0861 |
| 2021/0375008 | A1* | 12/2021 | Hassan | H04N 19/20 |
| 2021/0399911 | A1* | 12/2021 | Jorasch | H04L 12/1822 |
| 2022/0139245 | A1* | 5/2022 | Wilson | G06F 16/2457 434/362 |
| 2022/0165013 | A1* | 5/2022 | Velez | A63F 13/213 |
| 2022/0198206 | A1* | 6/2022 | Hargrove | G06V 40/10 |
| 2022/0198498 | A1* | 6/2022 | Huang | G06Q 20/387 |
| 2022/0269907 | A1* | 8/2022 | Yang | G06F 18/217 |
| 2022/0277008 | A1* | 9/2022 | Bordawekar | G06N 20/00 |
| 2022/0398276 | A1* | 12/2022 | Shirbhate | G06F 16/538 |
| 2023/0080175 | A1* | 3/2023 | Lee | A61B 5/16 705/2 |
| 2023/0229912 | A1* | 7/2023 | Zhang | G06N 3/0455 706/25 |
| 2024/0427868 | A1* | 12/2024 | Batt | G06F 21/32 |

OTHER PUBLICATIONS

Co-pending U.S. Appl. No. 17/210,176, entitled "Utilizing a Neural Network Model to Generate a Reference Image Based on a Combination of Images," by Souche et al., filed Mar. 23, 2021, 44 Pages.

* cited by examiner

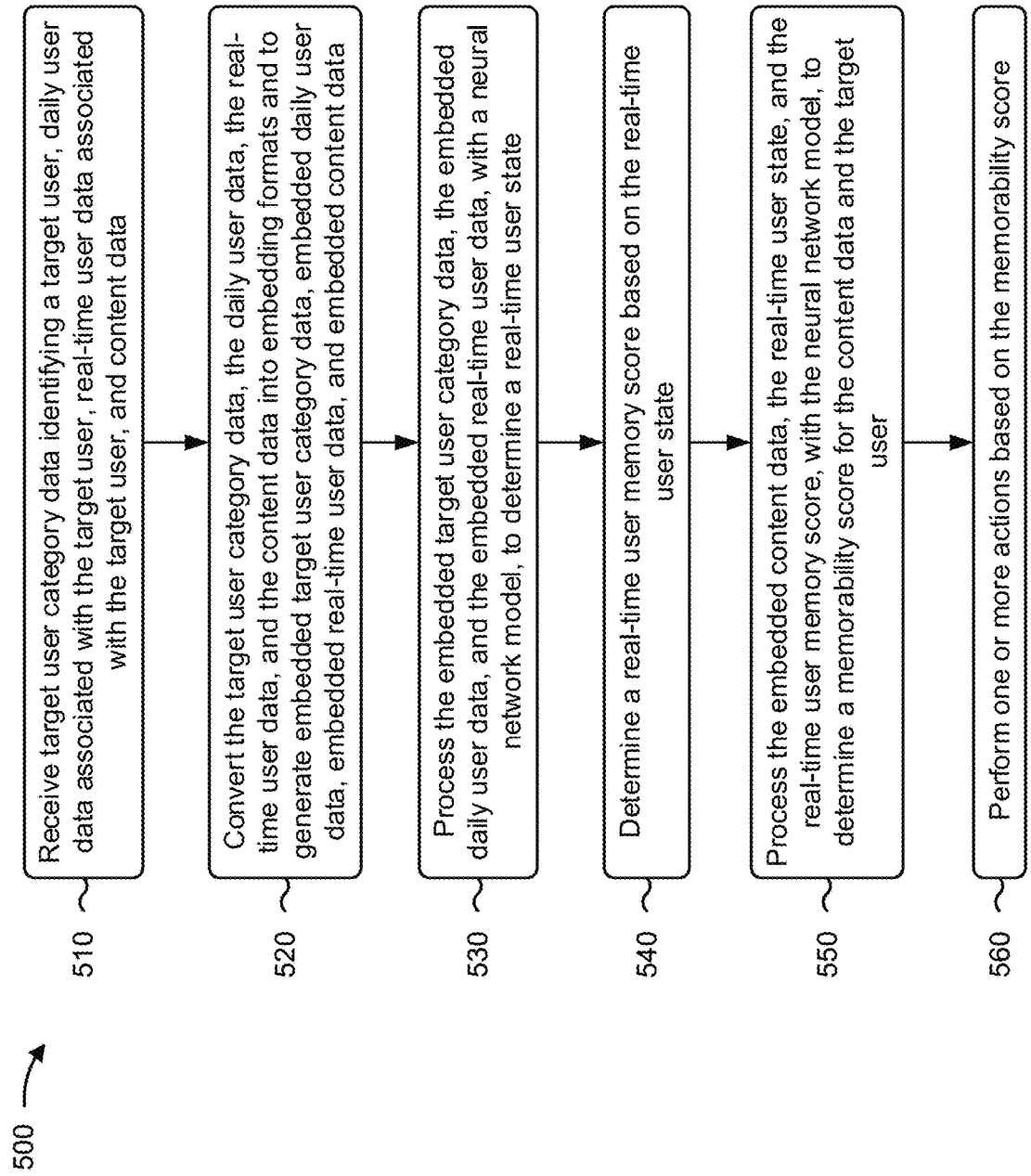

UTILIZING A NEURAL NETWORK MODEL TO PREDICT CONTENT MEMORABILITY BASED ON EXTERNAL AND BIOMETRIC FACTORS

BACKGROUND

A memorability score or a content retention score for content (e.g., an image, audio, video, and/or the like) corresponds to a quantity of subjects that correctly detected a repeat presentation of the content.

SUMMARY

In some implementations, a method includes receiving target user category data identifying a target user, daily user data associated with the target user, real-time user data associated with the target user, and content data. The method may include converting the target user category data, the daily user data, the real-time user data, and the content data into embedding formats and to generate embedded target user category data, embedded daily user data, embedded real-time user data, and embedded content data. The method may include processing the embedded target user category data, the embedded daily user data, and the embedded real-time user data, with a neural network model, to determine a real-time user state and determining a real-time user memory score based on the real-time user state. The method may include processing the embedded content data, the real-time user state, and the real-time user memory score, with the neural network model, to determine a memorability score for the content data and the target user and performing one or more actions based on the memorability score.

In some implementations, a device includes one or more memories and one or more processors to receive target user category data identifying a target user, daily user data associated with the target user, real-time user data associated with the target user, and content data and convert the target user category data, the daily user data, the real-time user data, and the content data into embedding formats and to generate embedded target user category data, embedded daily user data, embedded real-time user data, and embedded content data. The one or more processors may identify abnormal real-time user data and missing real-time user data based on the embedded daily user data and the embedded real-time user data and to generate modified embedded real-time user data and may process the embedded target user category data, the embedded daily user data, and the modified embedded real-time user data, with a neural network model, to determine a real-time user state. The one or more processors may determine a real-time user memory score based on the real-time user state and may process the embedded content data, the real-time user state, and the real-time user memory score, with the neural network model, to determine a memorability score for the content data and the target user. The one or more processors may perform one or more actions based on the memorability score.

In some implementations, a non-transitory computer-readable medium may store a set of instructions that includes one or more instructions that, when executed by one or more processors of a device, cause the device to receive target user category data identifying a target user, daily user data associated with the target user, real-time user data associated with the target user, and content data. The one or more instructions may cause the device to convert the target user category data, the daily user data, the real-time user data, and the content data into embedding formats and to generate embedded target user category data, embedded daily user data, embedded real-time user data, and embedded content data. The one or more instructions may cause the device to process the embedded target user category data, the embedded daily user data, and the embedded real-time user data, with a first neural network model, to determine a real-time user state. The one or more instructions may cause the device to determine a real-time user memory score based on the real-time user state and process the embedded content data, the real-time user state, and the real-time user memory score, with a second neural network model, to determine a memorability score for the content data and the target user. The one or more instructions may cause the device to perform one or more actions based on the memorability score.

BRIEF DESCRIPTION OF THE DRAWINGS

FIG. 5 is a flowchart of an example process for utilizing a neural network model to predict content memorability based on external and biometric factors.

DETAILED DESCRIPTION

Figure 1A:
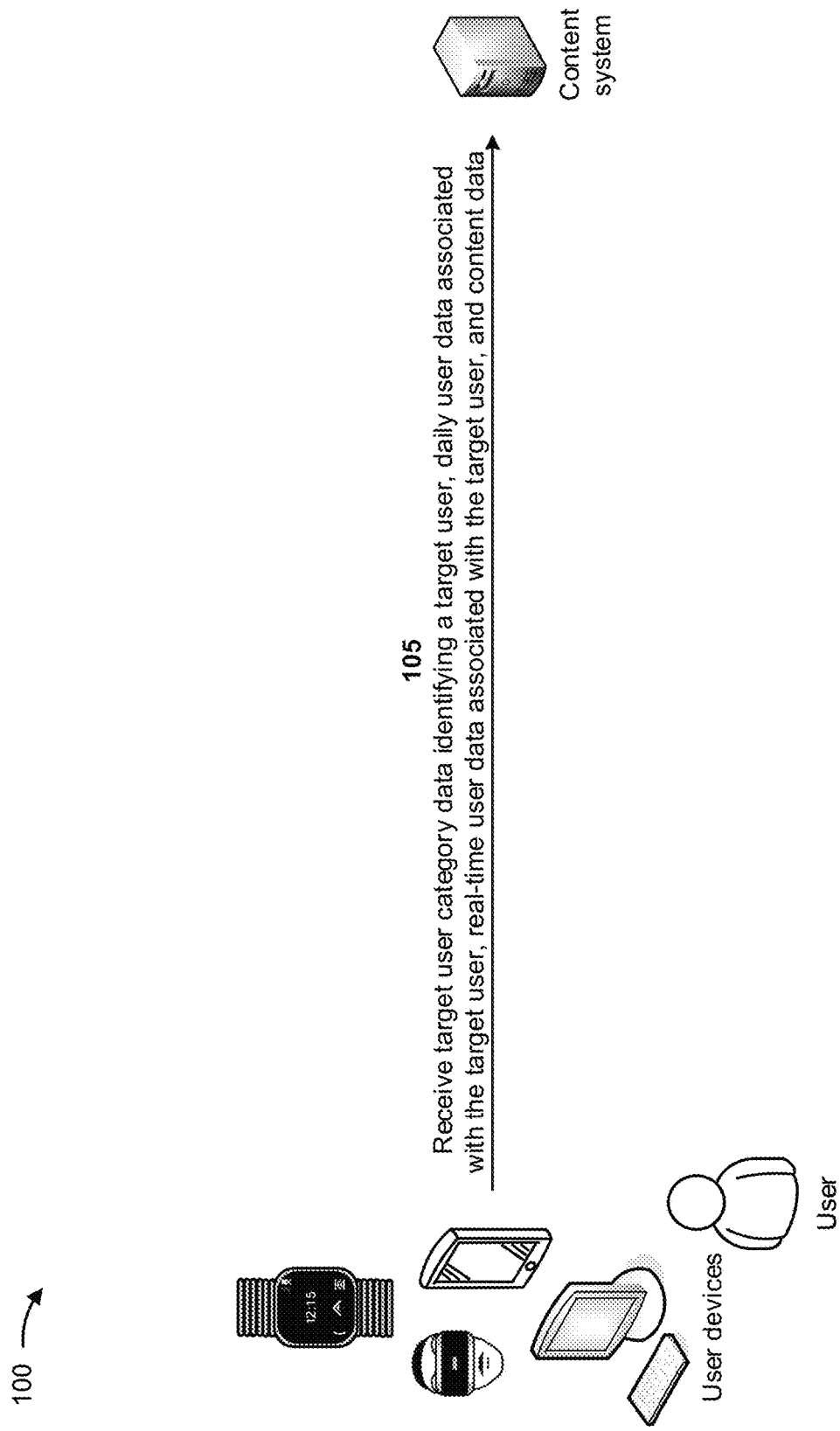
FIGS. 1A-1F are diagrams of an example implementation described herein.

The following detailed description of example implementations refers to the accompanying drawings. The same reference numbers in different drawings may identify the same or similar elements.

General memorability factors include media categories (e.g., posts on social media, advertisements on a streaming service, webpages, and/or the like) and target user categories (e.g., age, sex, position, job, and/or the like). Specific memorability factors include media information (e.g., content placement, media duration, media size, and/or the like) and target user data (e.g., personal memory, personal preferences, and/or the like).

Current techniques calculate a fixed memorability score for content (e.g., an image) by a pre-defined rule, with a fixed image exposure time and fixed time interval between two exposures. Memorable content for a first user category (e.g., a ten-year-old boy) is not necessarily memorable content for a second user category (e.g., a seventy-year-old woman). The memorability scores calculated for the memorable content are unable to distinguish the different user categories. An average person is now estimated to encounter thousands of advertisements every single day, and about eighty percent of users follow at least one business on social media, while two-hundred million users visit at least one business profile every day. Unfortunately, most users are unable to remember content posted by the businesses. Businesses have been producing higher quality content to increase memorability of the content. However, quantifying the memorability of the higher quality content is difficult.

Therefore, current techniques for calculating content memorability consume computing resources (e.g., processing resources, memory resources, communication resources, and/or the like), networking resources, and/or the like associated with generating content that is not memorable, losing opportunities for the business based on the unmemorable content, generating useless marketing plans based on the unmemorable content, and/or the like.

Some implementations described herein relate to a content system that utilizes a neural network model to predict content memorability based on external and biometric factors. For example, the content system may receive target user category data identifying a target user, daily user data associated with the target user, real-time user data associated with the target user (e.g., real-time relative to generation of the data, quasi-real-time data, such as data gathered quickly enough to support a computation that produces a value that adequately represents a current or near current state, condition, event, and/or the like), and content data. The content system may convert the target user category data, the daily user data, the real-time user data, and the content data into embedding formats (e.g., an embedding is a mapping of a discrete, categorical variable to a vector of continuous numbers. In the context of neural networks, embeddings are low-dimensional, learned continuous vector representations of discrete variables) and may generate embedded target user category data, embedded daily user data, embedded real-time user data, and embedded content data. The content system may process the embedded target user category data, the embedded daily user data, and the embedded real-time user data, with a neural network model, to determine a real-time user state and may determine a real-time user memory score based on the real-time user state. The content system may process the embedded content data, the real-time user state, and the real-time user memory score, with the neural network model, to determine a memorability score for the content data and the target user and may perform one or more actions based on the memorability score.

In this way, the content system utilizes a neural network model to predict content memorability based on external and biometric factors. The content system may receive target user data identifying a target user, daily user data and real-time user data associated with the target user, and content data identifying content. The content system may utilize a neural network model with the target user data, the daily user data, and the real-time user data to predict memorability of the content and may determine a content delivery strategy based on the memorability of the content. This, in turn, conserves computing resources, networking resources, and/or the like that would otherwise have been consumed in generating content that is not memorable, losing opportunities for the business based on the unmemorable content, generating useless marketing plans based on the unmemorable content, and/or the like.

FIGS. 1A-1F are diagrams of an example 100 associated with utilizing a neural network model to predict content memorability based on external and biometric factors. As shown in FIGS. 1A-1F, example 100 includes user devices and a content system. The user devices may include a desktop computer, a mobile telephone, a virtual reality device, wearable communication device, and/or the like associated with a user. The content system may include a system that utilizes a neural network model to predict content memorability based on external and biometric factors. Further details of the user devices and the content system are provided elsewhere herein.

As shown in FIG. 1A, and by reference number 105, the content system may receive, from the user devices, target user category data identifying a target user, daily user data associated with the target user, real-time user data associated with the target user, and content data. In some examples, the content system may receive (e.g., from the user devices) requests to improve measures of memorability of the content data and may receive the target user category data, the daily user data, the real-time user data, and the content data as part of the requests. In some examples, the content system may periodically receive the target user category data, the daily user data, the real-time user data, and the content data. The content system may store the target user category data, the daily user data, the real-time user data, and the content data in a data structure (e.g., a database, a table, a list, and/or the like) associated with the content system.

The target user category data may identify a particular target user category by specifying, for example, data identifying an age of the target user, data identifying a gender of the target user, data identifying a job description of the target user, data identifying a level of education of the target user, data identifying a level of income of the target user, data identifying a geographical location of the target user, data identifying an education of the target user, among other examples. In this regard, the target user category data may identify different target user categories such as a female target user, a male target user, a female target user of a particular age, a male target user of a particular age, a female target user of a particular age and located in a particular geographical location, among other examples.

The daily user data may include data identifying daily activities of the target user. For example, the daily user data may include data identifying daily hours of sleep received by the target user, a daily quantity of time exercising by the target user, a weight of the target user, a height of the target user, and/or the like. The real-time user data may include data identifying real-time activities of the target user that is received in real-time relative to performance of the real-time activities. For example, the real-time user data may include data identifying a current heartrate of the target user, a current oxygen level of the target user, a current blood pressure of the target user, an eye tracking history of the target user, a quantity of time utilizing one or more of the user devices by the target user (e.g., screen time), and/or the like. The content data may include data identifying content, such as images, videos, textual information, among other examples. In some implementations, the content may be obtained from websites, thumbnail images, posters, social media posts, among other examples.

Figure 1B:
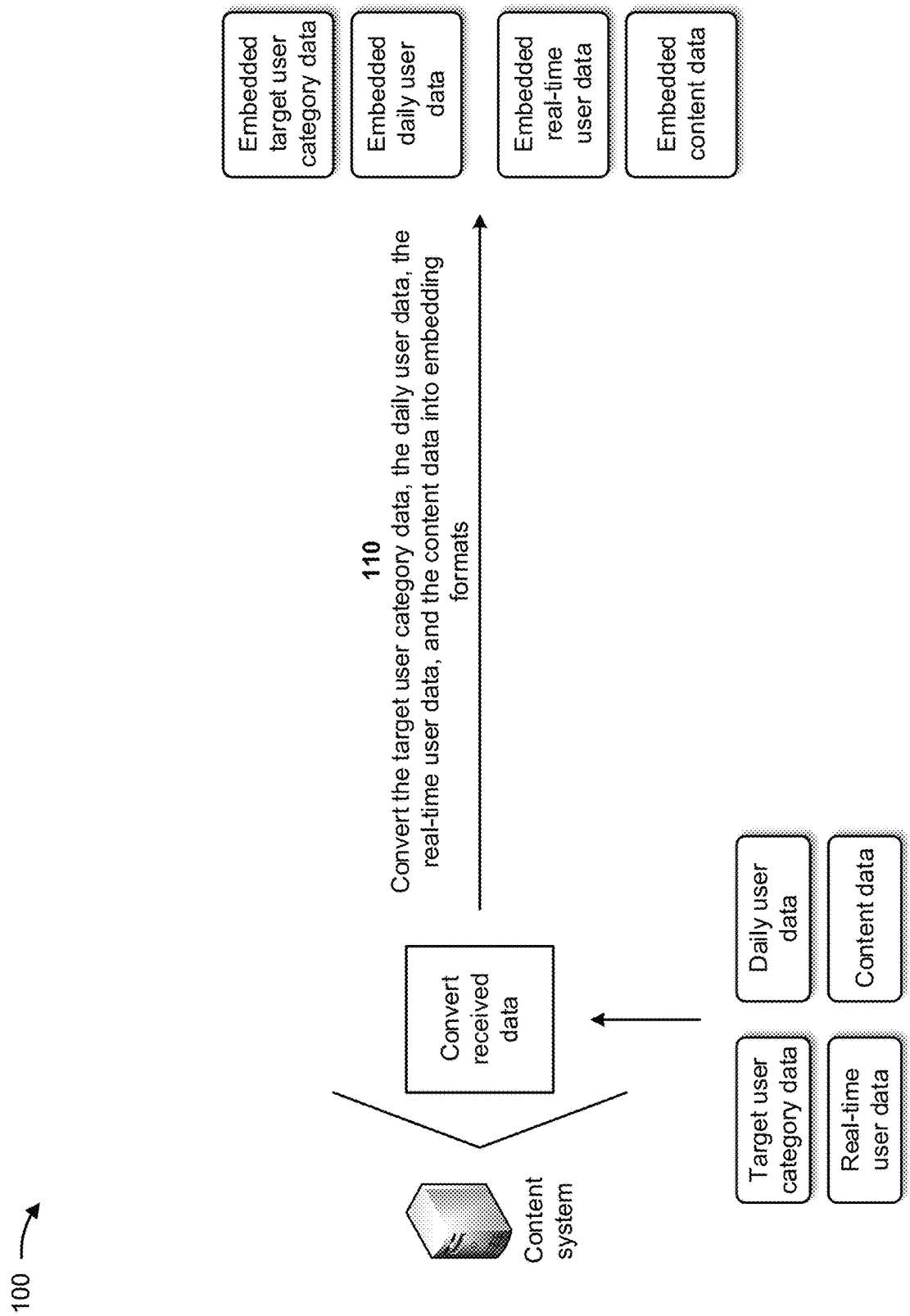

As shown in FIG. 1B, and by reference number 110, the content system may convert the target user category data, the daily user data, the real-time user data, and the content data into embedding formats. For example, the content system may convert the target user category data, the daily user data, the real-time user data, and the content data into embedded target user category data, embedded daily user data, embedded real-time user data, and embedded content data, respectively.

In some implementations, the content system utilizes probability vectors to encode or convert the target user category data and the daily user data into the embedded target user category data and the embedded daily user data, respectively. For example, a probability vector for a gender of the target user may include a male field, a female field, and weights associated with each field; a probability vector for an age of the target user may include a less than twenty field, a twenty to thirty field, a thirty to forty field, a forty to fifty field, a fifty to sixty field, a greater than sixty field, and weights associated with each field; a probability vector for a preference of the target user may include a car field, a game field, a beauty field, a work field, a sports field, a travel field, and weights associated with each field; a probability vector for a sleep quality of the target user may include a bad field, a normal field, a good field, and weights associated with each field; a probability vector for an exercise time of the target user may include a less than ten minutes field, a ten to thirty minutes field, a thirty to sixty minutes field, a greater than sixty minutes field, and weights associated with each field; and/or the like.

In some implementations, the content system utilizes one or more of a recurrent neural network (RNN) model, a long short-term memory (LSTM) neural network model, or a transformer neural network model to convert the real-time user data into the embedded real-time user data. For example, the content system may utilize a time series matrix to normalize the real-time user data and generate normalized real-time user data. The content system may process the normalized real-time user data, with the one or more of the RNN model, the LSTM neural network model, or the transformer neural network model, to convert the normalized real-time user data into the embedded real-time user data.

In some implementations, the content system may process different types of the content data, with different models, to convert the different types of the content data into the embedded content. For example, the content system may process one or more images provided in the content data, with a residual neural network (ResNet) model, to convert the one or more images into the embedded content. In another example, the content system may process one or more audio files provided in the content data, with a yet another Mobilenet Network (YamNet) model, to convert the one or more audio files into the embedded content. In still another example, the content system may process textual information provided in the content data, with a sentence transformer model, to convert the textual information into the embedded content.

Figure 1C:
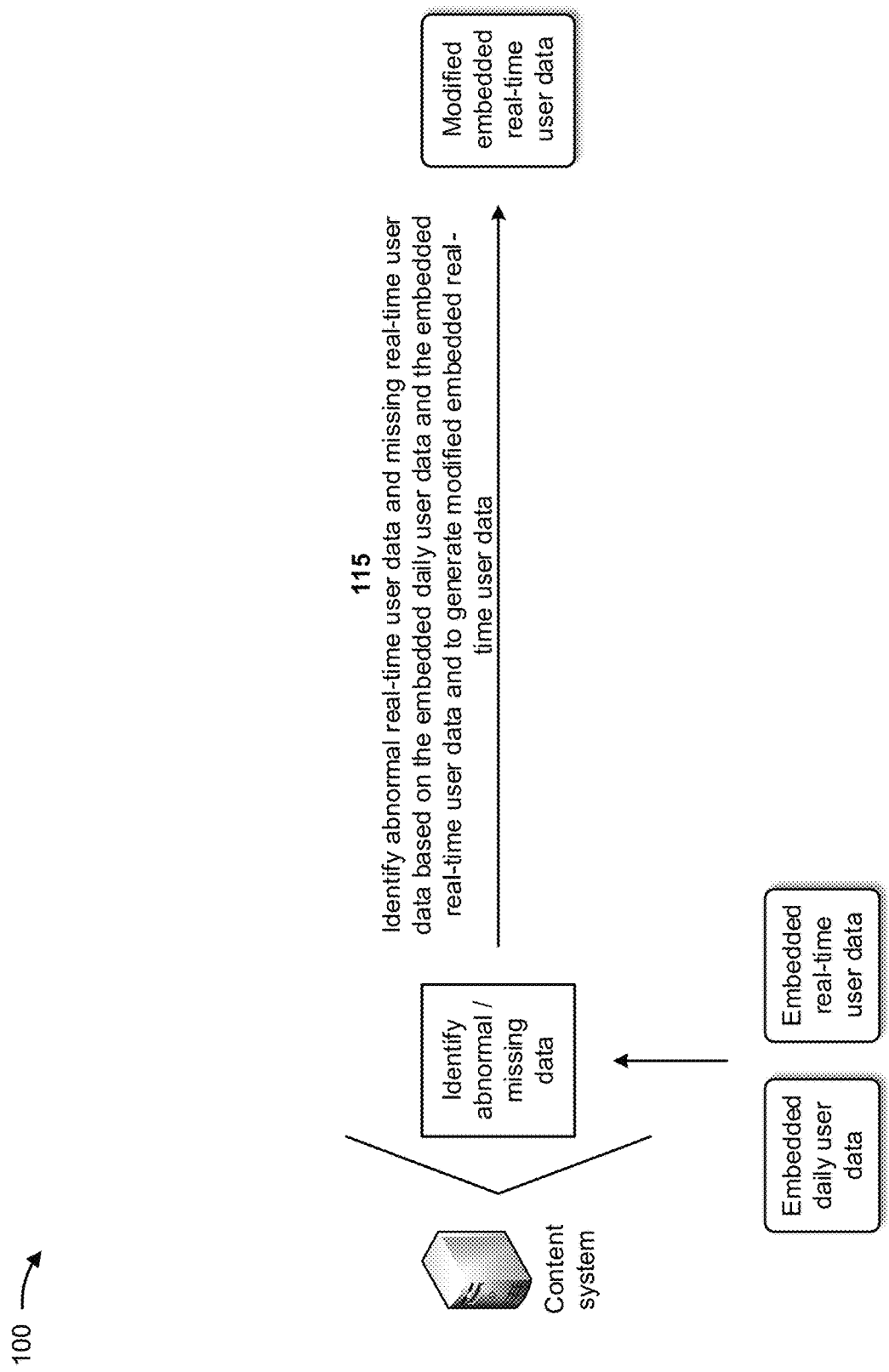

As shown in FIG. 1C, and by reference number 115, the content system may identify abnormal real-time user data and missing real-time user data based on the embedded daily user data and the embedded real-time user data and to generate modified embedded real-time user data. For example, the content system may not receive all of the real-time user data in real-time due to latency and the real-time user data may include abnormal values or may be missing values due to bad connectivity with the user devices. In such situations, the content system may process the embedded daily user data and the embedded real-time user data, with a predictive model, to identify abnormal values in the embedded real-time user data or to predict missing values in the embedded real-time user data. The predictive model may utilize the embedded daily user data to identify abnormal values in the embedded real-time user data or to predict missing values in the embedded real-time user data. The content system may remove or correct the abnormal values from the embedded real-time user data and may add the predicted missing values to the embedded real-time user data, to generate the modified embedded real-time user data.

Figure 1D:
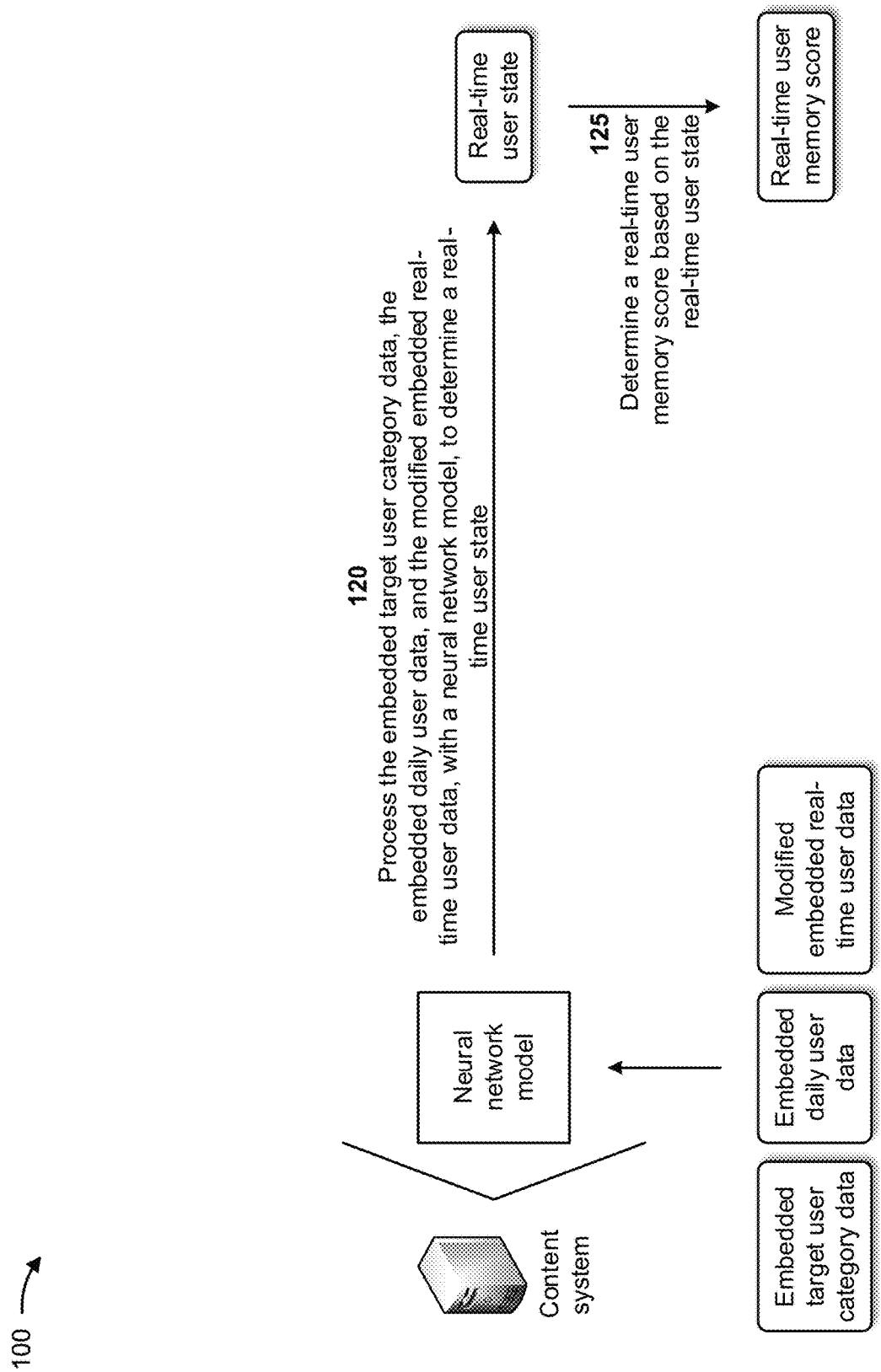

As shown in FIG. 1D, and by reference number 120, the content system may process the embedded target user category data, the embedded daily user data, and the modified embedded real-time user data, with a neural network model, to determine a real-time user state. The real-time user state may provide an indication of a user's current memory (e.g., a personal memory in real-time). In some implementations, the neural network model includes an RNN model, an LSTM neural network model, a transformer neural network model, and/or the like. The neural network model may be trained (e.g., by the content system or by another device) as described below in connection with FIG. 2. For example, the content system may process the embedded target user category data (e.g., identifying a young lady), the embedded daily user data (e.g., indicating that the young lady is interested in beauty and sports attire), and the modified embedded real-time user data (e.g., indicating that the young lady started to jog fifteen minutes ago with headphones), with the neural network model, to determine a real-time user state (e.g., indicating that a heart rate and breathing of the young lady indicate that she has decreasing personal memory). In such an example, the content system may determine to provide audio advertisements about beauty and sports to the young lady since she will not be able to view a screen while jogging and has decreasing personal memory.

As further shown in FIG. 1D, and by reference number 125, the content system may utilize the neural network model to determine a real-time user memory score based on the real-time user state. The real-time user memory score may provide an indication of a user's current memorability of input content (e.g., a memorability of the input content in real-time). Returning to the example above, based on the real-time user state (e.g., indicating that the heart rate and breathing of the young lady indicate that she has decreasing personal memory), the content system may determine a low real-time user memory score (e.g., indicating that the young lady has a low memorability of input content in real-time) for the young lady. In such an example, the content system may determine to provide shorter duration audio advertisements about beauty and sports to the young lady since she currently has low memorability on input content.

Figure 1E:
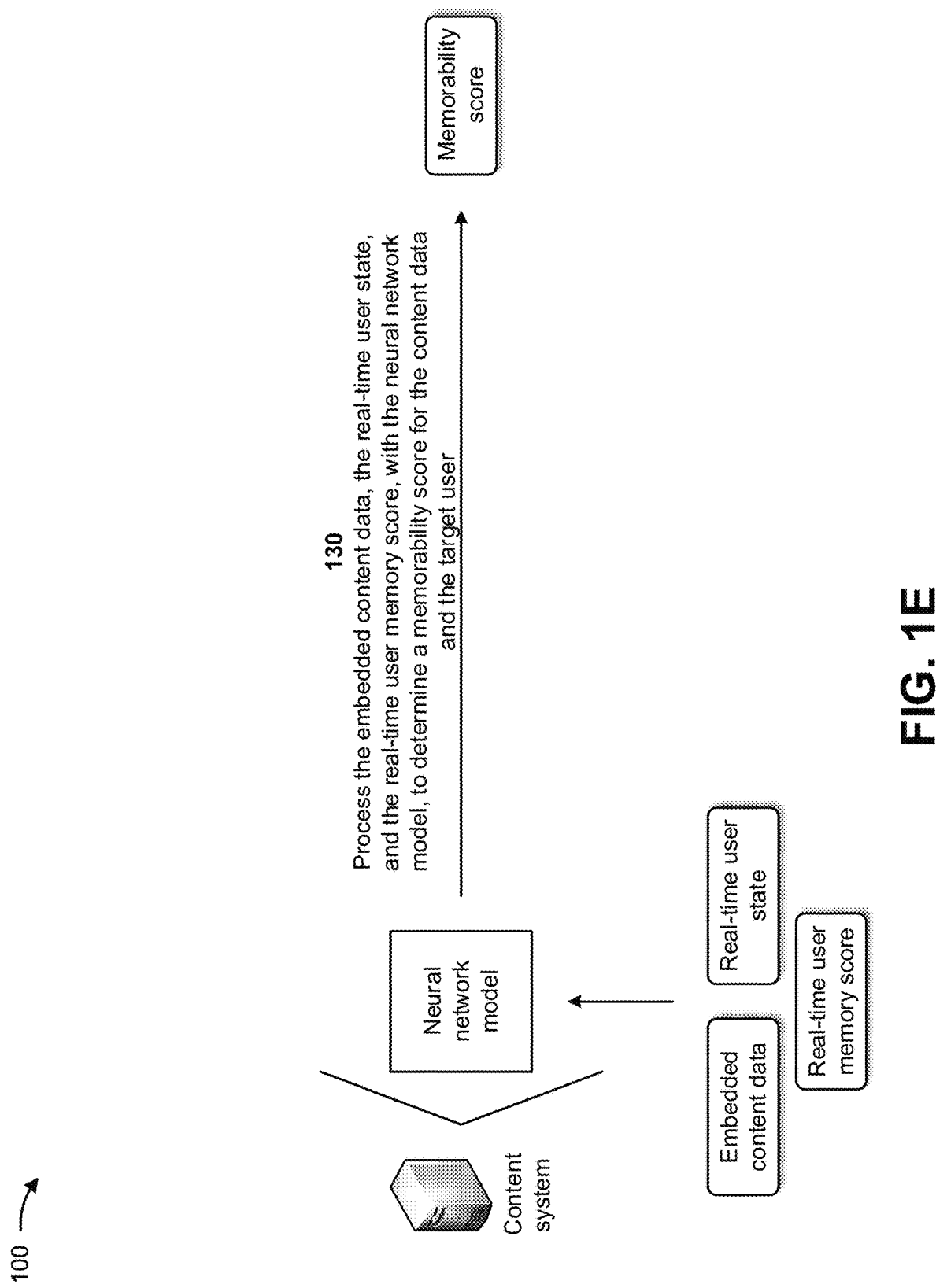

As shown in FIG. 1E, and by reference number 130, the content system may process the embedded content data, the real-time user state, and the real-time user memory score, with the neural network model, to determine a memorability score (e.g., a content retention score) for the content data and the target user. For example, the content system may provide the embedded content data, the real-time user state, and the real-time user memory score as an input to the neural network model and the neural network model may determine (or predict), as an output, the memorability score for the content data and the target user. Returning to the example above, based on the real-time user state (e.g., indicating that the heart rate and breathing of the young lady indicate that she has decreasing personal memory) and the real-time user memory score (e.g., indicating that the young lady has a low memorability of input content in real-time), the content system may determine the memorability score for the content data and the target user (e.g., the young lady). For example, if the content data relates to beauty or sports attire and is audio data, the memorability score for the content data may be higher than a memorability score for content data that relates to politics or travel and is audio data. Similarly, the memorability score for content data that relates to politics or travel and is audio data may be higher than a memorability score for content data that relates to politics or travel and is image data.

Figure 1F:
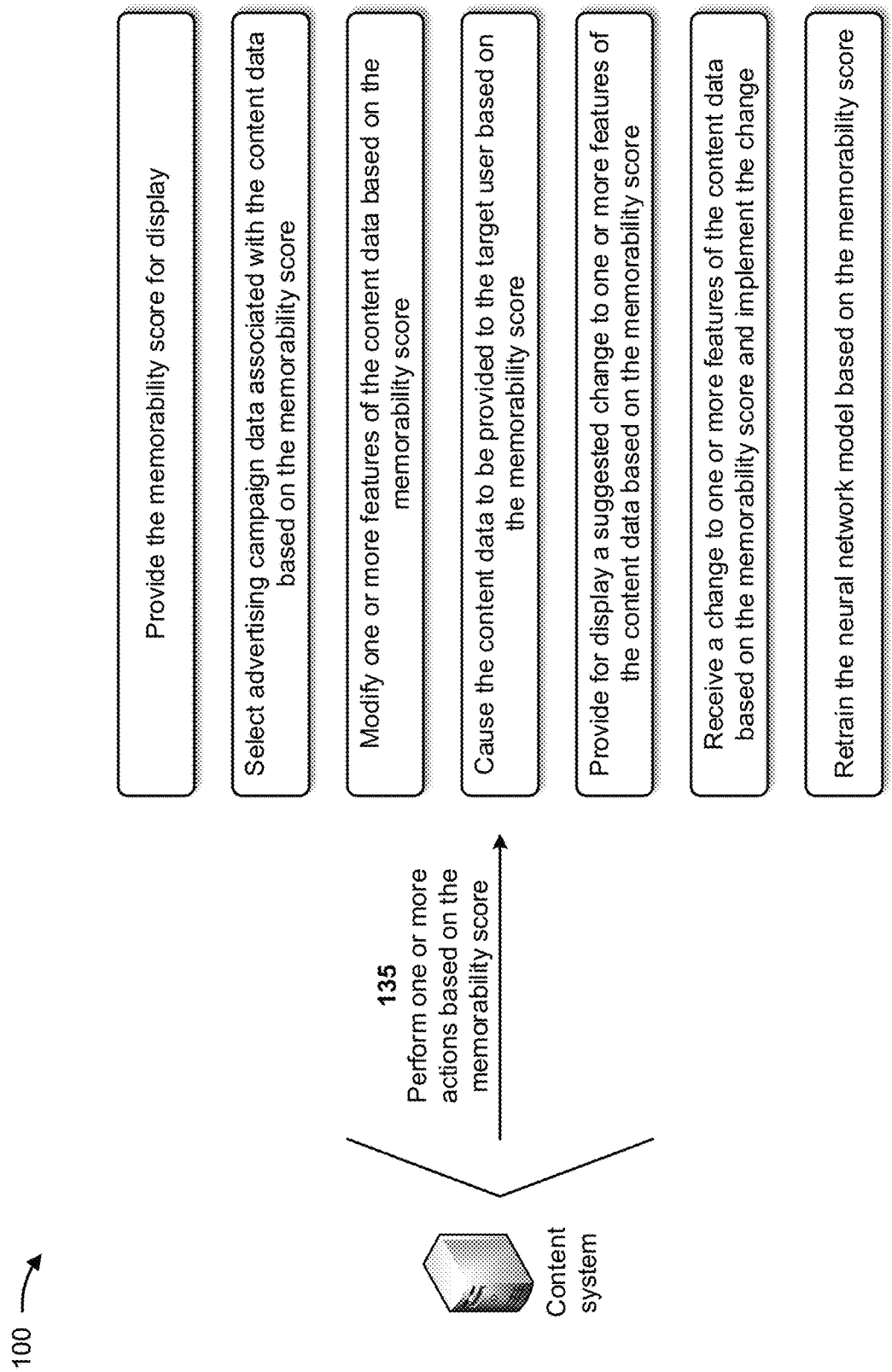

As shown in FIG. 1F, and by reference number 135, the content system may perform one or more actions based on the memorability score. In some implementations, the one or more actions include the content system providing the memorability score for display. For example, the content system may provide information regarding the memorability score (e.g., for the content data, for the target user, for user categories that represent subsets of the particular target user category, among other examples) for display via a user interface provided by a user device. A user of the user device may utilize the memorability score to generate and provide content that is memorable to the target user. In this way, the content system conserves computing resources, networking resources, and/or the like that would otherwise have been consumed in generating content that is not memorable, losing opportunities for the business based on the unmemorable content, generating useless marketing plans based on the unmemorable content, and/or the like.

In some implementations, the one or more actions include the content system selecting advertising campaign data associated with the content data based on the memorability score. For example, the content system may determine, based on the memorability score, that the target user is more likely to remember a visual advertisement rather than audio advertisement. Based on this determination, the content system may generate, for the target user, an advertising campaign that includes only visual advertisements. In this way, the content system conserves computing resources, networking resources, and/or the like that would otherwise have been consumed in generating a useless advertising campaign based on unmemorable content for the target user.

In some implementations, the one or more actions include the content system modifying one or more of the features of the content data based on the memorability score. For example, the content system may modify one or more features, based on the memorability score, to generate modified content data and may provide the modified content data to a user device (e.g., via a user interface). Additionally, or alternatively, the content system may modify the content data to move a location of an object (e.g., a logo or another type of object) within the content data based on the memorability score and may provide the modified content data to the user device (e.g., via the user interface). In this way, the content system may conserve what would have otherwise have been consumed by modifying different features of the content data that would not improve the memorability of the content data for the target user or that would decrease the memorability of the content data for the target user.

In some implementations, the one or more actions include the content system causing the content data to be provided to the target user based on the memorability score. For example, the content system may determine that the memorability score for the content data satisfies a threshold score associated with providing the content data to the target user. Based on this determination, the content system may provide the content data to a user device associated with the target user and the user device may display and/or play (e.g., in the cause of audio content) the content data for the target user. In this way, the content system conserves computing resources, networking resources, and/or the like that would otherwise have been consumed in generating content that is not memorable, losing opportunities for the business based on the unmemorable content, and/or the like.

In some implementations, the one or more actions include the content system providing, for display, a suggested change to one or more of the features of the content data based on the memorability score. In some implementations, the content system may identify one or more changes to one or more of the features associated with the memorability score (e.g., determined for the target user). Additionally, or alternatively, the content system may identify one or more memorable areas (of the content data) associated with the memorability score (e.g., determined for the target user). The content system may provide, to a user device for display, information identifying the one or more changes and/or information identifying the one or more memorable areas as suggested changes to improve a memorability score (for the content data) for the target user. In this way, the content system conserves computing resources, networking resources, and/or the like that would otherwise have been consumed in generating content that is not memorable, generating useless marketing plans based on the unmemorable content, and/or the like.

In some instances, the information identifying the one or more changes may include information identifying a measure of increase of memorability (for the target user) based on the one or more changes. For example, the content system may indicate that an increase of the contrast of the content data (e.g., a five percent increase) may increase a memorability score (e.g., from seventy percent to eighty percent) for the target user.

In some implementations, the one or more actions include the content system receiving a change to one or more of the features of the content data based on the memorability score and implementing the change. For example, the content system may receive information identifying the change from a user device. The content system may implement the change to the one or more features and generate modified content data in a manner similar to the manner described above. In some implementations, the content system may provide the modified content data to the user device. In some implementations, the content system may recalculate the memorability score based on the change to the one or more features of the content data in a manner similar to the manner described above. In this way, the content system conserves computing resources, networking resources, and/or the like that would otherwise have been consumed in generating content that is not memorable, generating useless marketing plans based on the unmemorable content, and/or the like.

In some implementations, the one or more actions include the content system retraining the neural network model based on the memorability score. The content system may utilize the memorability score as additional training data for retraining the neural network model, thereby increasing the quantity of training data available for training the neural network model. Accordingly, the content system may conserve computing resources associated with identifying, obtaining, and/or generating historical data for training the neural network model relative to other systems for identifying, obtaining, and/or generating historical data for training machine learning models.

In this way, the content system utilizes a neural network model to predict content memorability based on external and biometric factors. The content system may receive target user data identifying a target user, daily user data and real-time user data associated with the target user, and content data identifying content. The content system may utilize a neural network model with the target user data, the daily user data, and the real-time user data to predict memorability of the content and may determine a content delivery strategy based on the memorability of the content. This, in turn, conserves computing resources, networking resources, and/or the like that would otherwise have been consumed in generating content that is not memorable, losing opportunities for the business based on the unmemorable content, generating useless marketing plans based on the unmemorable content, and/or the like.

As indicated above, FIGS. 1A-1F are provided as an example. Other examples may differ from what is described with regard to FIGS. 1A-1F. The number and arrangement of devices shown in FIGS. 1A-1F are provided as an example.

In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
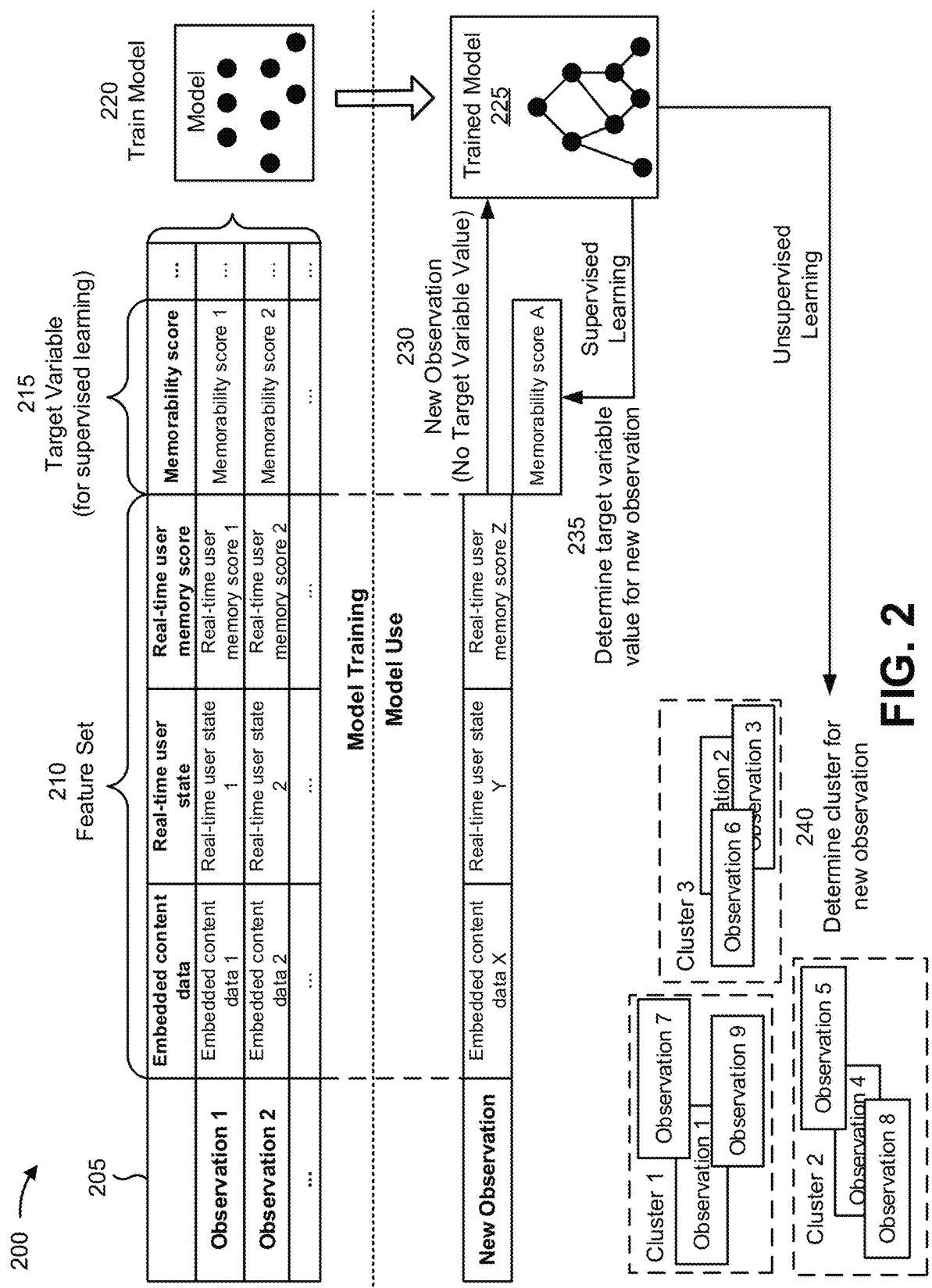
FIG. 2 is a diagram illustrating an example of training and using a machine learning model in connection with predicting content memorability based on external and biometric factors.

FIG. 2 is a diagram illustrating an example 200 of training and using a machine learning model (e.g., the neural network models) in connection with predicting content memorability based on external and biometric factors. The machine learning model training and usage described herein may be performed using a machine learning system. The machine learning system may include or may be included in a computing device, a server, a cloud computing environment, and/or the like, such as the content system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the content system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the content system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of embedded content data, a second feature of a real-time user state, a third feature of a real-time user memory score, and so on. As shown, for a first observation, the first feature may have a value of embedded content data 1, the second feature may have a value of real-time user state 1, the third feature may have a value of real-time user memory score 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is a memorability score, which has a value of memorability score 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of embedded content data X, a second feature of real-time user state Y, a third feature of real-time user memory score Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of memorability score A for the target variable of the memorability score for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., an embedded content data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a real-time user state cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to predict content memorability based on external and biometric factors. The machine learning system enables recognition and/or identification of tens, hundreds, thousands, or millions of features and/or feature values for tens, hundreds, thousands, or millions of observations, thereby increasing accuracy and consistency and reducing delay associated with predicting content memorability based on external and biometric factors relative to requiring computing resources to be allocated for tens, hundreds, or thousands of operators to manually predict content memorability based on external and biometric factors.

As indicated above, FIG. 2 is provided as an example. Other examples may differ from what is described in connection with FIG. 2.

Figure 3:
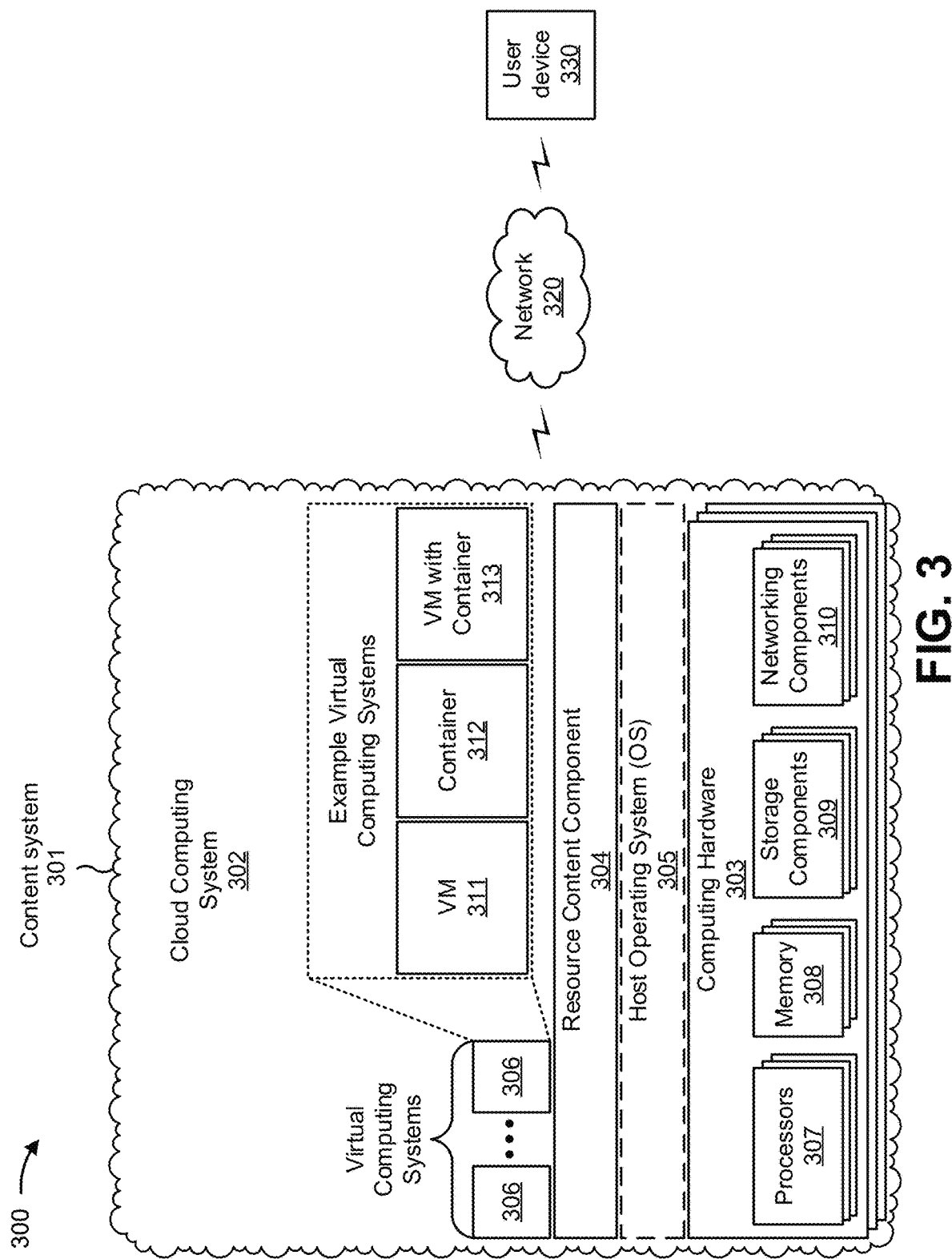
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a content system 301, which may include one or more elements of and/or may execute within a cloud computing system 302. The cloud computing system 302 may include one or more elements 303-313, as described in more detail below. As further shown in FIG. 3, environment 300 may include a network 320 and/or a user device 330. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the content system 301 may include one or more elements 303-313 of the cloud computing system 302, may execute within the cloud computing system 302, and/or may be hosted within the cloud computing system 302, in some implementations, the content system 301 may not be cloud-based (e.g., may be implemented outside of a cloud computing system) or may be partially cloud-based. For example, the content system 301 may include one or more devices that are not part of the cloud computing system 302, such as device 400 of FIG. 4, which may include a standalone server or another type of computing device. The content system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

User device 330 includes one or more devices capable of receiving, generating, storing, processing, and/or providing information, as described elsewhere herein. User device 330 may include a communication device and/or a computing device. For example, user device 330 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. User device 330 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
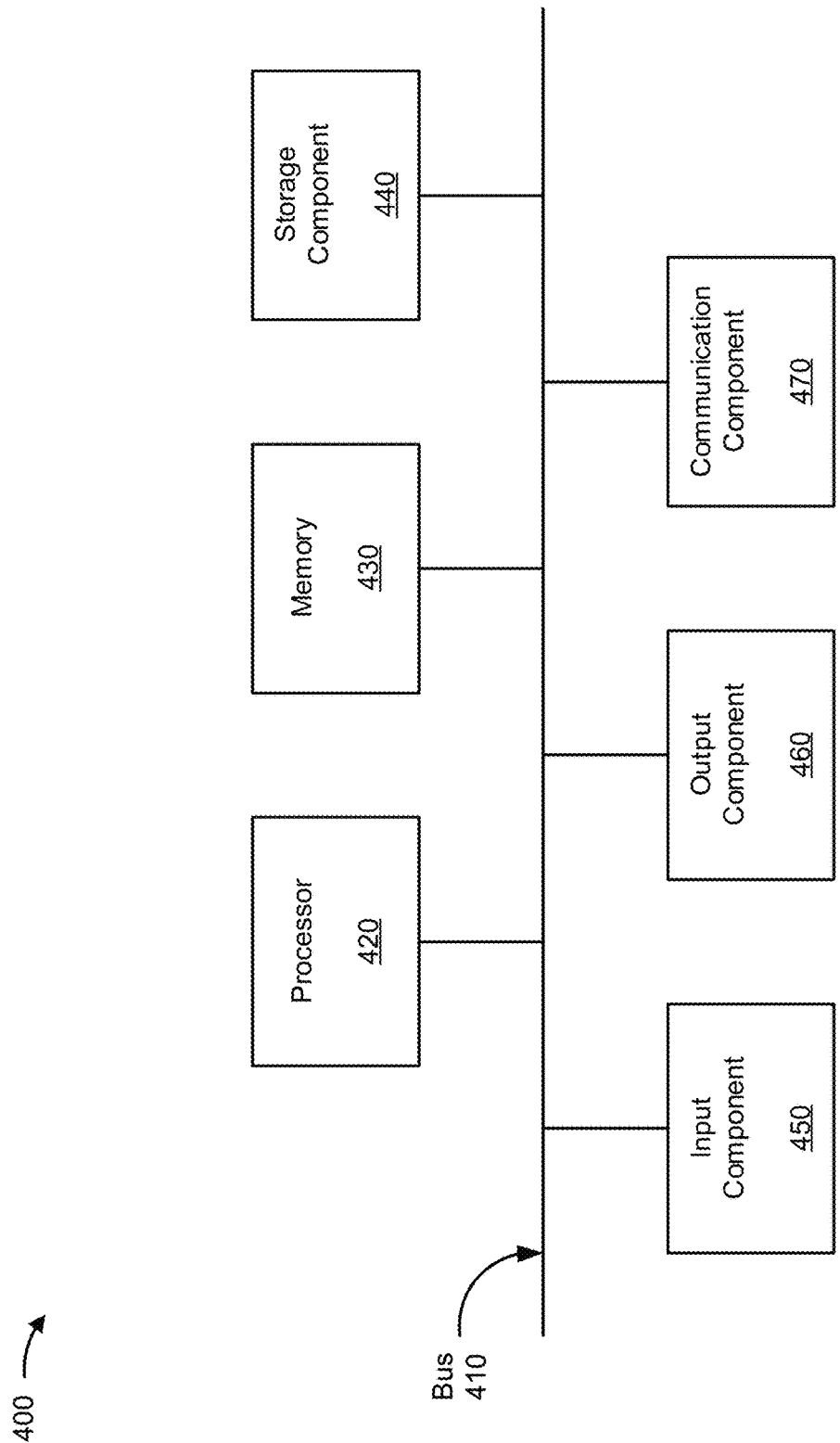
FIG. 4 is a diagram of example components of one or more devices of FIG. 3.

FIG. 4 is a diagram of example components of a device 400, which may correspond to content system 301 and/or user device 330. In some implementations, content system 301 and/or user device 330 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random-access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid-state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 for utilizing a neural network model to predict content memorability based on external and biometric factors. In some implementations, one or more process blocks of FIG. 5 may be performed by a device (e.g., content system 301). In some implementations, one or more process blocks of FIG. 5 may be performed by another device or a group of devices separate from or including the device, such as a user device (e.g., user device 330). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving target user category data identifying a target user, daily user data associated with the target user, real-time user data associated with the target user, and content data (block 510). For example, the device may receive target user category data identifying a target user, daily user data associated with the target user, real-time user data associated with the target user, and content data, as described above.

As further shown in FIG. 5, process 500 may include converting the target user category data, the daily user data, the real-time user data, and the content data into embedding formats and to generate embedded target user category data, embedded daily user data, embedded real-time user data, and embedded content data (block 520). For example, the device may convert the target user category data, the daily user data, the real-time user data, and the content data into embedding formats and to generate embedded target user category data, embedded daily user data, embedded real-time user data, and embedded content data, as described above.

As further shown in FIG. 5, process 500 may include processing the embedded target user category data, the embedded daily user data, and the embedded real-time user data, with a neural network model, to determine a real-time user state (block 530). For example, the device may process the embedded target user category data, the embedded daily user data, and the embedded real-time user data, with a neural network model, to determine a real-time user state, as described above.

As further shown in FIG. 5, process 500 may include determining a real-time user memory score based on the real-time user state (block 540). For example, the device may determine a real-time user memory score based on the real-time user state, as described above.

As further shown in FIG. 5, process 500 may include processing the embedded content data, the real-time user state, and the real-time user memory score, with the neural network model, to determine a memorability score for the content data and the target user (block 550). For example, the device may process the embedded content data, the real-time user state, and the real-time user memory score, with the neural network model, to determine a memorability score for the content data and the target user, as described above.

As further shown in FIG. 5, process 500 may include performing one or more actions based on the memorability score (block 560). For example, the device may perform one or more actions based on the memorability score, as described above.

Process 500 may include additional implementations, such as any single implementation or any combination of implementations described below and/or in connection with one or more other processes described elsewhere herein.

In a first implementation, process 500 includes identifying abnormal real-time user data and missing real-time user data based on the embedded daily user data and the embedded real-time user data.

In a second implementation, alone or in combination with the first implementation, converting the target user category data, the daily user data, the real-time user data, and the content data into the embedding formats includes utilizing probability vectors to convert the target user category data and the daily user data into the embedded target user category data and the embedded daily user data, respectively; utilizing a recurrent neural network model, a long short-term memory neural network model, or a transformer neural network model to convert the real-time user data into the embedded real-time user data; processing one or more images provided in the content data, with a residual neural network model, to convert the one or more images into the embedded content; processing one or more audio files provided in the content data, with a yet another Mobilenet Network model, to convert the one or more audio files into the embedded content; and processing textual information provided in the content data, with a sentence transformer model, to convert the textual information into the embedded content.

In a third implementation, alone or in combination with one or more of the first and second implementations, the neural network model includes one or more of a recurrent neural network model, a long short-term memory neural network model, or a transformer neural network model.

In a fourth implementation, alone or in combination with one or more of the first through third implementations, the content data includes data identifying one or more of an image, a video, or textual information.

In a fifth implementation, alone or in combination with one or more of the first through fourth implementations, the target user category data includes data identifying one or more of an age of the target user, a gender of the target user, a job description of the target user, a location of the target user, an education of the target user, or an income level of the target user.

In a sixth implementation, alone or in combination with one or more of the first through fifth implementations, the daily user data includes data identifying one or more of daily hours of sleep received by the target user, a daily quantity of time exercising by the target user, or a weight of the target user.

In a seventh implementation, alone or in combination with one or more of the first through sixth implementations, the real-time user data includes data identifying one or more of a current heartrate of the target user, a current oxygen level of the target user, a current blood pressure of the target user, an eye tracking history of the target user, or a quantity of time utilizing one or more user devices by the target user.

In an eighth implementation, alone or in combination with one or more of the first through seventh implementations, performing the one or more actions based on the memorability score includes one or more of providing the memorability score for display, modifying one or more features of the content data based on the memorability score, or retraining the neural network model based on the memorability score.

In a ninth implementation, alone or in combination with one or more of the first through eighth implementations, performing the one or more actions based on the memorability score includes selecting advertising campaign data associated with the content data based on the memorability score, and causing an advertising campaign to be implemented based on the advertising campaign data.

In a tenth implementation, alone or in combination with one or more of the first through ninth implementations, performing the one or more actions based on the memorability score includes modifying one or more features of the content data based on the memorability score and to generate modified content data, and causing the modified content data to be provided to the target user.

In an eleventh implementation, alone or in combination with one or more of the first through tenth implementations, performing the one or more actions based on the memorability score includes one or more of causing the content data to be provided to the target user based on the memorability score, or providing for display a suggested change to one or more features of the content data based on the memorability score.

In a twelfth implementation, alone or in combination with one or more of the first through eleventh implementations, performing the one or more actions based on the memorability score includes receiving a change to one or more features of the content data based on the memorability score, and causing the change to be implemented for the content data.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method to predict content memorability in a network, comprising:
   receiving, by one or more processors of a device including hardwired circuitry, target user category data identifying a target user, daily user data associated with the target user, real-time user data associated with the target user, and content data, wherein the real-time user data includes biometric information of the target user, and wherein the biometric information of the target user is received from a sensor employed in one or more user devices;
   converting, by the one or more processors, the target user category data and the daily user data into embedding formats to generate embedded target user category data and embedded daily user data;
   normalizing, by the one or more processors, the real-time user data by using a time series matrix to generate normalized real-time user data;
   converting, by the one or more processors, the normalized real-time user data into embedded real-time user data by processing the normalized real-time user data with one or more neural network models, wherein the one or more neural network models includes at least one of a recurrent neural network model, a long short-term memory neural network model, or a transformer neural network model;
   converting, by the one or more processors, the content data into embedded content data by:
      converting one or more images provided in the content data into the embedded content by processing the one or more images with a residual neural network model;
      converting one or more audio files provided in the content data into the embedded content by processing the one or more audio files with a Mobilenet Network model; and
      converting textual information provided in the content data into the embedded content by processing the textual information with a sentence transformer model;
   processing, by the one or more processors, the embedded target user category data, the embedded daily user data, and the embedded real-time user data, with the one or more neural network models, to determine a real-time user state;
   determining, by the one or more processors, a real-time user memory score based on the real-time user state;
   processing, by the one or more processors, the embedded content data, the real-time user state, and the real-time user memory score, with the one or more neural network models, to determine a memorability score for the content data and the target user to predict the content memorability in the network; and
   performing, by the one or more processors, one or more actions based on the memorability score, wherein the one or more actions comprise retraining the one or more neural network models based on the memorability score.

2. The method of claim 1, further comprising:
   identifying abnormal real-time user data and missing real-time user data based on the embedded daily user data and the embedded real-time user data.

3. The method of claim 1, wherein converting the target user category data, and the daily user data into the embedding formats comprises:
   utilizing probability vectors to convert the target user category data and the daily user data into the embedded target user category data and the embedded daily user data, respectively.

4. The method of claim 1, wherein the content data includes data identifying one or more of:
   an image,
   a video, or
   textual information.

5. The method of claim 1, wherein the target user category data includes data identifying one or more of:
   an age of the target user,
   a gender of the target user,
   a job description of the target user,
   a location of the target user,
   an education of the target user, or
   an income level of the target user.

6. The method of claim 1, wherein the daily user data includes data identifying one or more of:
   daily hours of sleep received by the target user,
   a daily quantity of time exercising by the target user, or
   a weight of the target user.

7. A device to predict content memorability in a network, comprising:
   one or more memories;
   hardwired circuitry; and
   one or more processors coupled to the one or more memories and the hardwired circuitry, wherein the one or more processors are configured to:
receive target user category data identifying a target user, daily user data associated with the target user, real-time user data associated with the target user, and content data,
wherein the real-time user data includes biometric information of the target user, and
wherein the biometric information of the target user is received from a sensor employed in one or more user devices;
convert the target user category data, the daily user data and the real-time user data into embedding formats to generate embedded target user category data and embedded daily user data;
normalize the real-time user data by using a time series matrix to generate normalized real-time user data;
convert the normalized real-time user data into embedded real-time user data by processing the normalized real-time user data with one or more neural network models, wherein the one or more neural network models includes at least one of a recurrent neural network model, a long short-term memory neural network model, or a transformer neural network model;
convert the content data into embedded content data by:
converting one or more images provided in the content data into the embedded content by processing the one or more images with a residual neural network model;
converting one or more audio files provided in the content data into the embedded content by processing the one or more audio files with a Mobilenet Network model; and
converting textual information provided in the content data into the embedded content by processing the textual information with a sentence transformer model;
identify abnormal real-time user data and missing real-time user data based on the embedded daily user data and the embedded real-time user data and to generate modified embedded real-time user data;
process the embedded target user category data, the embedded daily user data, and the modified embedded real-time user data, with the one or more neural network models, to determine a real-time user state;
determine a real-time user memory score based on the real-time user state;
process the embedded content data, the real-time user state, and the real-time user memory score, with the one or more neural network models, to determine a memorability score for the content data and the target user to predict the content memorability in the network; and
perform one or more actions based on the memorability score, wherein the one or more processors, to perform the one or more actions based on the memorability score, are configured to retrain the one or more neural network models based on the memorability score.

8. The device of claim 7, wherein the real-time user data includes data identifying one or more of:
a current heartrate of the target user,
a current oxygen level of the target user,
a current blood pressure of the target user,
an eye tracking history of the target user, or
a quantity of time utilizing the one or more user devices by the target user.

9. The device of claim 7, wherein the one or more processors, to perform the one or more actions based on the memorability score, are further configured to one or more of:
provide the memorability score for display; or
modify one or more features of the content data based on the memorability score.

10. The device of claim 7, wherein the one or more processors, to perform the one or more actions based on the memorability score, are further configured to:
select advertising campaign data associated with the content data based on the memorability score; and
cause an advertising campaign to be implemented based on the advertising campaign data.

11. The device of claim 7, wherein the one or more processors, to perform the one or more actions based on the memorability score, are further configured to:
modify one or more features of the content data based on the memorability score and to generate modified content data; and
cause the modified content data to be provided to the target user.

12. The device of claim 7, wherein the one or more processors, to perform the one or more actions based on the memorability score, are further configured to one or more of:
cause the content data to be provided to the target user based on the memorability score; or
provide for display a suggested change to one or more features of the content data based on the memorability score.

13. The device of claim 7, wherein the one or more processors, to perform the one or more actions based on the memorability score, are further configured to:
receive a change to one or more features of the content data based on the memorability score; and
cause the change to be implemented for the content data.

14. A non-transitory computer-readable medium storing a set of instructions, the set of instructions comprising:
one or more instructions that, when executed by one or more processors of a device including hardwired circuitry to predict content memorability in a network, cause the device to:
receive target user category data identifying a target user, daily user data associated with the target user, real-time user data associated with the target user, and content data,
wherein the real-time user data includes biometric information of the target user, and
wherein the biometric information of the target user is received from a sensor employed in one or more user devices;
convert the target user category data, the daily user data and the real-time user data, and the content data into embedding formats and to generate embedded target user category data and embedded daily user data;
normalize the real-time user data by using a time series matrix to generate normalized real-time user data;
convert the normalized real-time user data into embedded real-time user data by processing the normalized real-time user data with one or more neural network models, wherein the one or more neural network models includes at least one of a recurrent neural network model, a long short-term memory neural network model, or a transformer neural network model;

convert the content data into embedded content data by:
  converting one or more images provided in the content data into the embedded content by processing the one or more images with a residual neural network model;
  converting one or more audio files provided in the content data into the embedded content by processing the one or more audio files with a Mobile-net Network model; and
  converting textual information provided in the content data into the embedded content by processing the textual information with a sentence transformer model;
process the embedded target user category data, the embedded daily user data, and the embedded real-time user data, with the one or more a first neural network models, to determine a real-time user state;
determine a real-time user memory score based on the real-time user state;
process the embedded content data, the real-time user state, and the real-time user memory score, with the one or more neural network models, to determine a memorability score for the content data and the target user to predict the content memorability in the network; and
perform one or more actions based on the memorability score, wherein the one or more processors, to perform the one or more actions based on the memorability score, are configured to retrain the one or more neural network models based on the memorability score.

15. The non-transitory computer-readable medium of claim 14, wherein the one or more instructions, that cause the device to convert the target user category data and the daily user data into the embedding formats, cause the device to:
  utilize probability vectors to convert the target user category data and the daily user data into the embedded target user category data and the embedded daily user data, respectively.

16. The non-transitory computer-readable medium of claim 14, wherein the content data includes data identifying one or more of an image, a video, or textual information;

wherein the target user category data includes data identifying one or more of an age, a gender, a job description, a location, an education, or an income level of the target user;
wherein the daily user data includes data identifying one or more of daily hours of sleep received by the target user, a daily quantity of time exercising by the target user, or a weight of the target user; and
wherein the real-time user data includes data identifying one or more of a current heartrate of the target user, a current oxygen level of the target user, a current blood pressure of the target user, an eye tracking history of the target user, or a quantity of time utilizing the one or more user devices by the target user.

17. The non-transitory computer-readable medium of claim 14, wherein the one or more instructions, that cause the device to perform the one or more actions based on the memorability score, cause the device further to one or more of:
  provide the memorability score for display; or
  modify one or more features of the content data based on the memorability score.

18. The non-transitory computer-readable medium of claim 14, wherein the one or more instructions, that cause the device to perform the one or more actions based on the memorability score, cause the device further to:
  select advertising campaign data associated with the content data based on the memorability score; and
  cause an advertising campaign to be implemented based on the advertising campaign data.

19. The non-transitory computer-readable medium of claim 14, wherein the one or more instructions, that cause the device to perform the one or more actions based on the memorability score, cause the device further to:
  modify one or more features of the content data based on the memorability score and to generate modified content data; and
  cause the modified content data to be provided to the target user.

* * * * *